(12) United States Patent
Jeong (10) Patent No.: US 10,974,632 B2
(45) Date of Patent: Apr. 13, 2021

(54) HEADREST MOVING DEVICE

(71) Applicant: WOOBO TECH CO., LTD., Pyeongtaek-si (KR)

(72) Inventor: Hae Il Jeong, Incheon (KR)

(73) Assignee: WOOBO TECH CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/624,137

(22) PCT Filed: Jul. 17, 2018

(86) PCT No.: PCT/KR2018/008050
§ 371 (c)(1),
(2) Date: Dec. 18, 2019

(87) PCT Pub. No.: WO2019/017669
PCT Pub. Date: Jan. 24, 2019

(65) Prior Publication Data
US 2020/0171992 A1    Jun. 4, 2020

(30) Foreign Application Priority Data

Jul. 18, 2017 (KR) ......................... 10-2017-0090826

(51) Int. Cl.
*B60N 2/427* (2006.01)
*B60N 2/815* (2018.01)
*A47C 7/38* (2006.01)

(52) U.S. Cl.
CPC ................ *B60N 2/815* (2018.02); *A47C 7/38* (2013.01)

(58) Field of Classification Search
CPC ........ B60N 2/815; B60N 2/818; B60N 2/894; B60N 2/865; B60N 2/844; A47C 7/38
(Continued)

(56) References Cited

U.S. PATENT DOCUMENTS 7,621,598 B2 * 11/2009 Humer ..................... B60N 2/66
297/410
7,845,721 B2 * 12/2010 Maeda ................... B60N 2/844
297/216.12
(Continued)

FOREIGN PATENT DOCUMENTS

JP    2000-083756 A    3/2000
KR    20-0368784       12/2004
(Continued)

OTHER PUBLICATIONS

International Searching Authority/KR, International Search Report and Written Opinion of the International Searching Authority, Application No. PCT/KR2018/008050, dated Nov. 16, 2018, 7 pages.

*Primary Examiner* — Shin H Kim
(74) *Attorney, Agent, or Firm* — Sunstein LLP (57) ABSTRACT

The present invention relates to a headrest moving device. Particularly, an elastic rib is disposed between a lock plate and a case, the elastic rib applies an elastic force to the lock plate in a direction different from a sliding direction of the lock plate, a curved part is formed between both ends of the elastic rib, the curved part is in contact with the case or the lock plate, and both ends of the elastic rib are spaced apart from a surface in contact with the curved part, and thus, there is no gap between the lock plate and the case, and the lock plate can be smoothly slid.

20 Claims, 8 Drawing Sheets

(58) Field of Classification Search
USPC .......................................................... 297/410
See application file for complete search history.

(56) References Cited

U.S. PATENT DOCUMENTS

| | | | | |
|---|---|---|---|---|
| 9,004,602 | B2 * | 4/2015 | Gottwald | B60N 2/818 |
| | | | | 297/410 |
| 9,403,458 | B2 * | 8/2016 | Jeong | B60N 2/844 |
| 10,358,070 | B2 * | 7/2019 | Diefenthaler | B60N 2/894 |
| 10,550,906 | B2 * | 2/2020 | Kober | B60N 2/844 |
| 2006/0186720 | A1 * | 8/2006 | Linardi | B60N 2/821 |
| | | | | 297/410 |
| 2006/0214491 | A1 * | 9/2006 | Metz | B60N 2/818 |
| | | | | 297/410 |
| 2008/0191522 | A1 * | 8/2008 | Maeda | B60N 2/888 |
| | | | | 297/216.12 |
| 2011/0006578 | A1 * | 1/2011 | Veine | B60N 2/818 |
| | | | | 297/410 |
| 2011/0148171 | A1 * | 6/2011 | Charles | B60N 2/818 |
| | | | | 297/410 |
| 2013/0193736 | A1 * | 8/2013 | Shimizu | B60N 2/847 |
| | | | | 297/391 |
| 2013/0207437 | A1 | 8/2013 | Gottwald et al. | |
| 2014/0001811 | A1 * | 1/2014 | Haeske | B60N 2/888 |
| | | | | 297/409 |
| 2015/0145310 | A1 | 5/2015 | Jeong | |
| 2020/0171992 | A1 * | 6/2020 | Jeong | A47C 7/38 |

FOREIGN PATENT DOCUMENTS

| | | |
|---|---|---|
| KR | 10-2013-0045404 A | 5/2013 |
| KR | 10-1383094 B1 | 4/2014 |
| WO | WO 2014-087488 A1 | 6/2014 |

\* cited by examiner

HEADREST MOVING DEVICE

This application is the national phase entry of international patent application no. PCT/KR2018/008050 filed Jul. 17, 2018 and claims the benefit of Korean patent application No. 10-2017-0090826, filed Jul. 18, 2017, the disclosures of which are incorporated herein by reference in their entirety.

TECHNICAL FIELD

This invention relates to a headrest moving device. Particularly, an elastic rib is disposed between a lock plate and a case to apply an elastic force to the lock plate in a direction different from a sliding direction of the lock plate, a curved part is formed between both ends of the elastic rib to be in contact with the lock plate or the case, and both ends of the elastic rib are spaced apart from a surface in contact with the curved part.

BACKGROUND ART

Korean Registration Patent No. 10-1383094 (Patent Document 1) discloses a headrest moving device which includes a cover including a front surface and a rear surface, a middle cover disposed in the cover and having a hollow part formed therein, a locking cover inserted into the hollow part, connected to the cover, and having a tooth disposed in a front-rear direction, a lock pin plate installed to be slidable in a lateral direction on the middle cover and including a lock pin inserted into the tooth, a lock plate including a through hole through which a vertical part of the stay rod passes, installed on the middle cover to be slidable in a lateral direction, and connected to the lock pin plate, a return spring returning the lock plate or the lock pin plate, and a button moving the lock plate in a lateral direction, wherein the cover is integrally formed so that a gap between the front surface and the rear surface is constantly maintained.

In the headrest moving device of Patent Document 1, when the button is pushed and the lock plate is slid, vertical locking is released and a height of the headrest is adjusted. Further, a rib is formed between the lock plate and the cover to prevent movement of the lock plate.

However, when the cover and the lock plate have inaccurate dimensions, there is a problem of a clearance even though the rib is formed.

PRIOR-ART DOCUMENTS

Patent Documents (Patent Document 1) Korean Registration Patent No. 10-1383094

DISCLOSURE OF INVENTION

Technical Problem

The present invention is contrived to solve the foregoing problem, an objective of the present invention is to provide a headrest moving device which prevents movement of a lock plate and allows the lock plate to be smoothly slid.

Solution to Problem

In order to accomplish the foregoing objective, a headrest moving device according to the present invention includes a case, and a lock plate which is slidable in the case and inserted into a locking groove of a stay rod, wherein an elastic rib is disposed between the lock plate and the case, the elastic rib applies an elastic force to the lock plate in a direction different from a sliding direction of the lock plate, a curved part is formed between both ends of the elastic rib, the curved part is in contact with the lock plate or the case, and both ends of the elastic rib are spaced apart from a surface in contact with the curved part.

One end of the elastic rib may be connected to the lock plate.

The elastic rib may be disposed in front of, behind, above, or under the lock plate.

A rib may be disposed between the lock plate and the case at a side opposite of the elastic rib.

The elastic rib may have a cantilever form and may be connected to the lock plate or the case, and an inserting groove into which a free end of the elastic rib is inserted may be formed at a portion to which the elastic rib is connected.

The case may include a button configured to press the lock plate, wherein the button may include a button part, a bezel part in which the button part may be slidably installed, and a button returning spring configured to return the button part, and a bumper may be disposed between the button part and the button returning spring or between the bezel part and the button returning spring.

Advantageous Effects of Invention

A headrest moving device according to the present invention has the following effects.

An elastic rib is disposed between a lock plate and a case, and the elastic rib is configured to apply an elastic force to the lock plate in a direction different from a sliding direction of the lock plate, and a curved part is formed between both ends of the elastic rib to be in contact with the lock plate or the case, and the both ends of the elastic rib are spaced apart from a surface in contact with the curved part, and thus there is no gap between the lock plate and the case, and the lock plate can be smoothly slid.

One end of the elastic rib is connected to the lock plate, and thus the structure is simpler than a structure in which an elastic rib is formed in a case.

The elastic rib is disposed in front of, behind, above, or under the lock plate, and the lock plate is prevented from moving in a vertical direction or a front-rear direction. Therefore, the lock plate is more stably locked in a locking groove of a stay rod.

A rib is disposed between the lock plate and the case at a side opposite of the elastic rib, and a structure of the device can be simple.

The elastic rib has a cantilever form and is connected to the lock plate or the case, and an inserting groove into which a free end of the elastic rib is inserted is formed at a portion to which the elastic rib is connected to prevent a free end of the elastic rib from being locked in the lock plate or the case.

MODE FOR THE INVENTION

Hereinafter, exemplary embodiments of the present invention will be described in detail with reference to the accompanying drawings.

For reference, components of the present invention which are the same as those in the related art will be described below with reference to the above-described related art, and the detailed description thereof will be omitted.

When it is described that any part is positioned "on" another part, it means that the part is directly on another part or above another part with at least one intervening part. In contrast, when any part is described to be positioned "directly on" another part, it means that there is no intervening part between the two parts.

Technical terms used herein are for only describing specific embodiments and are not intended to limit the present invention. Singular forms used herein include plural forms unless explicitly described to the contrary. A meaning of "comprising" used in the specification embodies specific characteristics, areas, integers, steps, operations, elements, and/or components, and does not exclude the presence or addition of other characteristics, areas, integers, steps, operations, elements, and/or components.

Terms representing a relative space such as "lower," "upper," and the like may be used for more easily describing a relationship with another part of a part shown in the drawings. Such terms are intended to include other meanings or operations of an apparatus used together with a meaning that is intended in the drawings. For example, when an apparatus is inverted in the drawings, any part described as disposed at a "lower" part of another part is described as being disposed at an "upper" part of another part. Therefore, the illustrative term "lower" includes both upward and downward directions. An apparatus may be rotated by 90° or another angle, and the terms representing the relative space are accordingly analyzed.

When it is described that any element is "connected" to another element, it should be understood that the element is directly connected to another element or still another element may be interposed therebetween.

As illustrated in FIGS. 1 to 10, a headrest-moving device of an embodiment of the present invention includes a case and a lock plate 500 which is slidable on the case and inserted into a locking groove 711 of a stay rod 700. An elastic rib is disposed between the case and the lock plate 500, and the elastic rib is configured to apply an elastic force to the lock plate 500 in a direction different from a sliding direction of the lock plate 500. A curved part is formed between both ends of the elastic rib to be in contact with the lock plate 500 or the case, and both ends of the elastic rib are disposed to be spaced apart from a surface in contact with the curved part.

Hereinafter, a width direction of a vehicle is referred to as a lateral direction, a longitudinal direction of the vehicle is referred to as a front-rear direction, and a vertical direction of the vehicle is referred to as a vertical direction.

The case is fixed to a backrest or a headrest.

In the embodiment of the present invention, the case is fixed to and installed on the headrest.

The case is fixed to surround the lock plate 500 and the stay rod 700.

The case is formed of a plastic material and is molded in an injection-molding manner.

Figure 1:
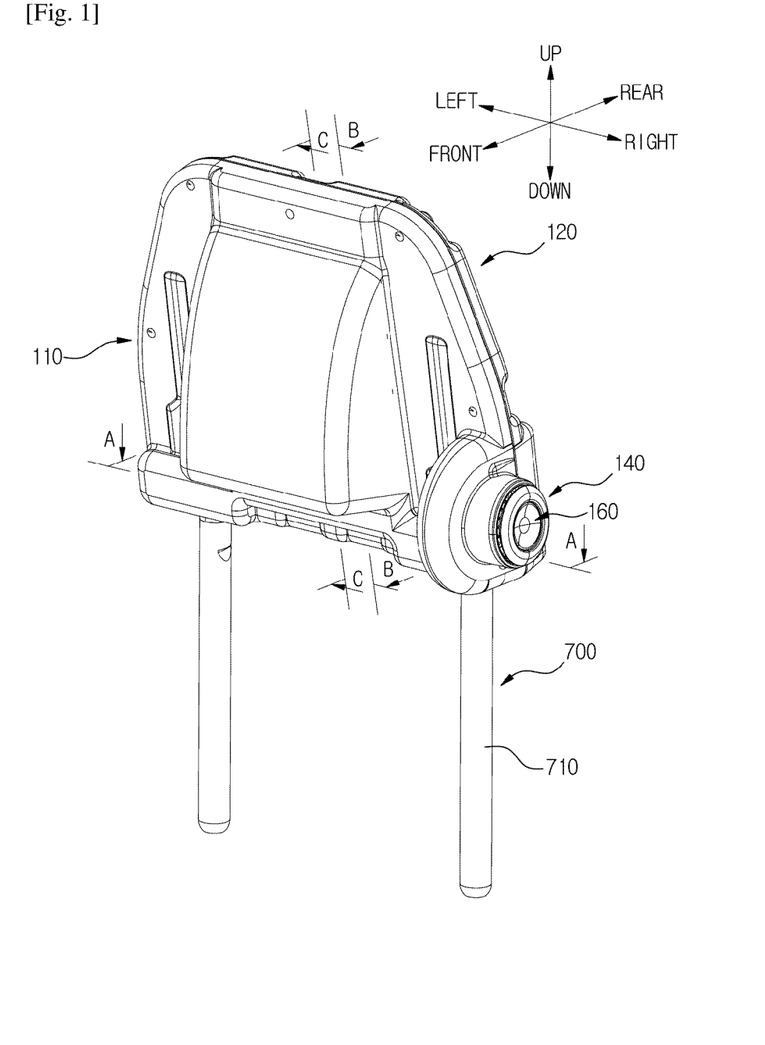
FIG. 1 is a perspective view of a headrest moving device according to one exemplary embodiment of the present invention.

As illustrated in FIG. 1, the case includes a first case 110 disposed at a front side and a second case 120 installed behind the first case 110.

The first case 110 includes a front surface, upper and lower surfaces, and both side surfaces.

The second case 120 includes a rear surface, upper and lower surfaces, and both side surfaces.

The first case 110 includes a first protruding part 111 formed in the center of the front surface to protrude forward and a second protruding part 112 formed at a lower right portion of the front surface to protrude forward.

The first protruding part 111 and the second protruding part 112 are spaced apart from each other in a lateral direction.

The first protruding part 111 is spaced apart from the upper and lower ends and both sides of the first case 110. The first protruding part 111 is formed to gradually protrude forward in a downward direction. The front surface of the first protruding part 111 is formed to be curved in a circular arc form. The first protruding part 111 supports a head of a passenger.

The second protruding part 112 is disposed at a lower right edge side of the headrest.

The front surface of the second protruding part 112 is formed in a circular arc shape.

A first stay rod-seating groove, a first bushing-seating groove, a first lock plate-seating groove, and a first push-transmitting part-moving space 116 are formed in a rear surface of the first case 110.

Figure 3:
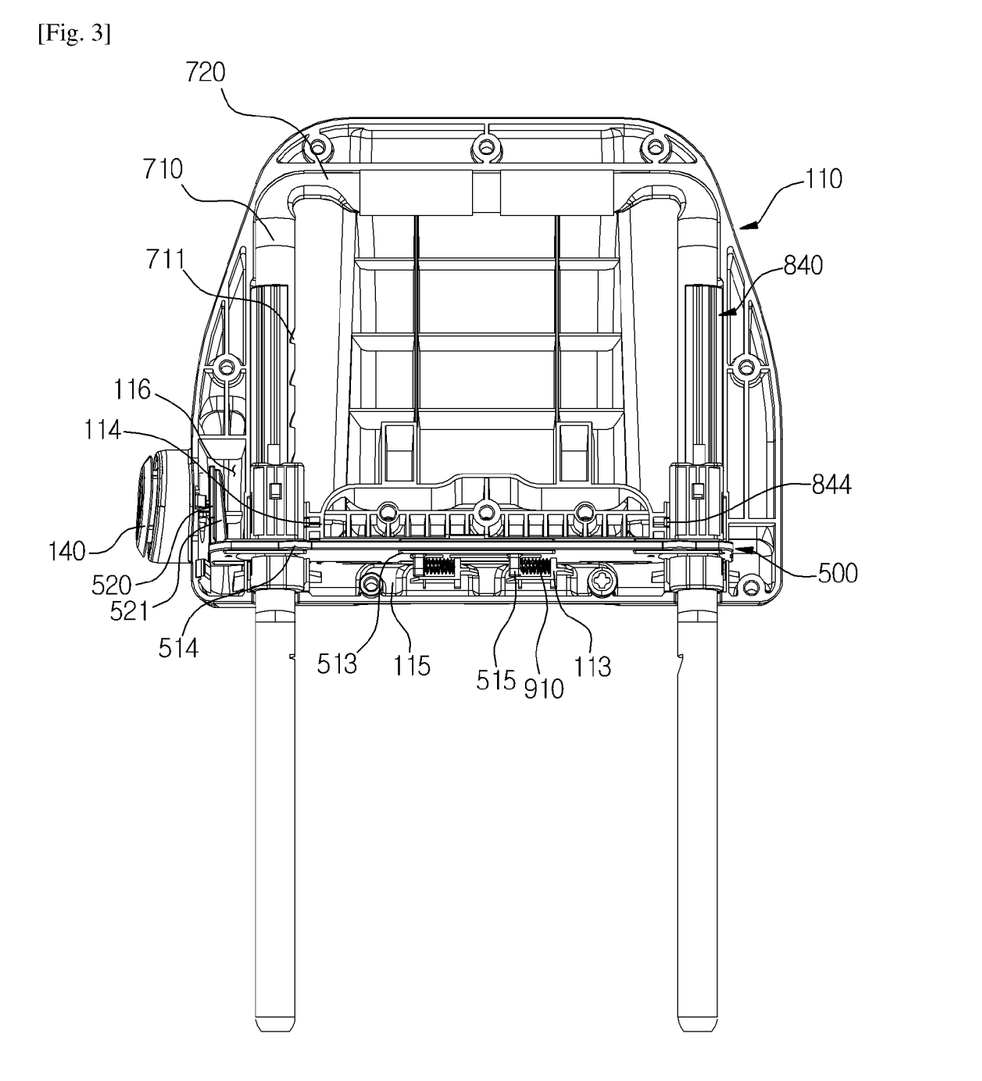
FIG. 3 is a rear view in a state in which a second case is removed from the headrest moving device according to one exemplary embodiment of the present invention.

As illustrated in FIG. 3, an upper portion of a first rod 710 and a second rod 720 of the stay rod 700 are seated on the first stay rod-seating groove. The first rod 710 is a vertically disposed rod, the second rod 720 is a horizontally disposed rod, and the first rod 710 and the second rod 720 are integrally formed. The first stay rod-seating groove is formed so that lower and rear portions thereof are open. The first stay rod-seating groove is formed along an edge of the first case 110.

The first bushing-seating groove is formed to communicate with the first stay rod-seating groove. The first bushing-seating groove is formed so that a rear side thereof is open and is vertically formed. Two first bushing-seating grooves are formed and are disposed at both sides of the first case 110.

The first lock plate-seating groove is formed in a lateral direction and communicates with the first stay rod-seating groove and the first bushing-seating groove. The first lock plate-seating groove is disposed at a lower portion of a rear surface of the first case 110. The first lock plate-seating groove is formed between a first upper contact part 114 and a first lower contact part 115. The first upper contact part 114 and the first lower contact part 115 are disposed under the first protruding part 111. The first upper contact part 114 and the first lower contact part 115 are disposed between the two first bushing-seating grooves. A fastening hole into which a fastening member, such as a bolt, is inserted is formed at each of a middle portion of the first upper contact part 114 and both sides of the first lower contact part 115. A lateral length of the first upper contact part 114 is formed longer than that of the first lower contact part 115.

A locking protrusion by which the second rod 720 is locked is formed at a rear surface of the first case 110 to protrude rearward. The locking protrusions are formed at both sides of an upper portion of the first upper contact part 114. The locking protrusions are disposed between the first bushing-seating grooves at both sides of the first case 110. The locking protrusions prevent other components from being damaged when a user excessively pulls the case.

The first push-transmitting part-moving space 116 is formed at a rear side of the second protruding part 112. The first push-transmitting part-moving space 116 is formed so that a rear side thereof is open. The first push-transmitting part-moving space 116, the first stay rod-seating groove, the first bushing-seating groove, and the first lock plate-seating groove are separated by a partition wall. Therefore, a foreign material introduced through the first push-transmitting part-moving space 116 is prevented from being introduced into the case. The partition wall has a hole formed therein to communicate with the first lock plate-seating groove.

A second supporting protrusion 113 is formed on a rear surface of the first case 110. The second supporting protrusion 113 is formed to protrude rearward. The second supporting protrusion 113 is vertically formed. The second supporting protrusion 113 is disposed under the first lock plate-seating groove. Two second supporting protrusions 113 are formed to be spaced apart from each other in a lateral direction.

An assembling protrusion inserting groove is formed in a rear surface of the first case 110. The assembling protrusion inserting grooves are formed at both sides of the first upper contact part 114. The assembling protrusion inserting groove is formed so that a rear side and a left or right side thereof are open. The assembling protrusion inserting groove communicates with the first bushing-seating groove.

An enhancing rib is formed in a lattice shape on a rear surface of the first case 110 and a front surface of the second case 120.

Figure 2:
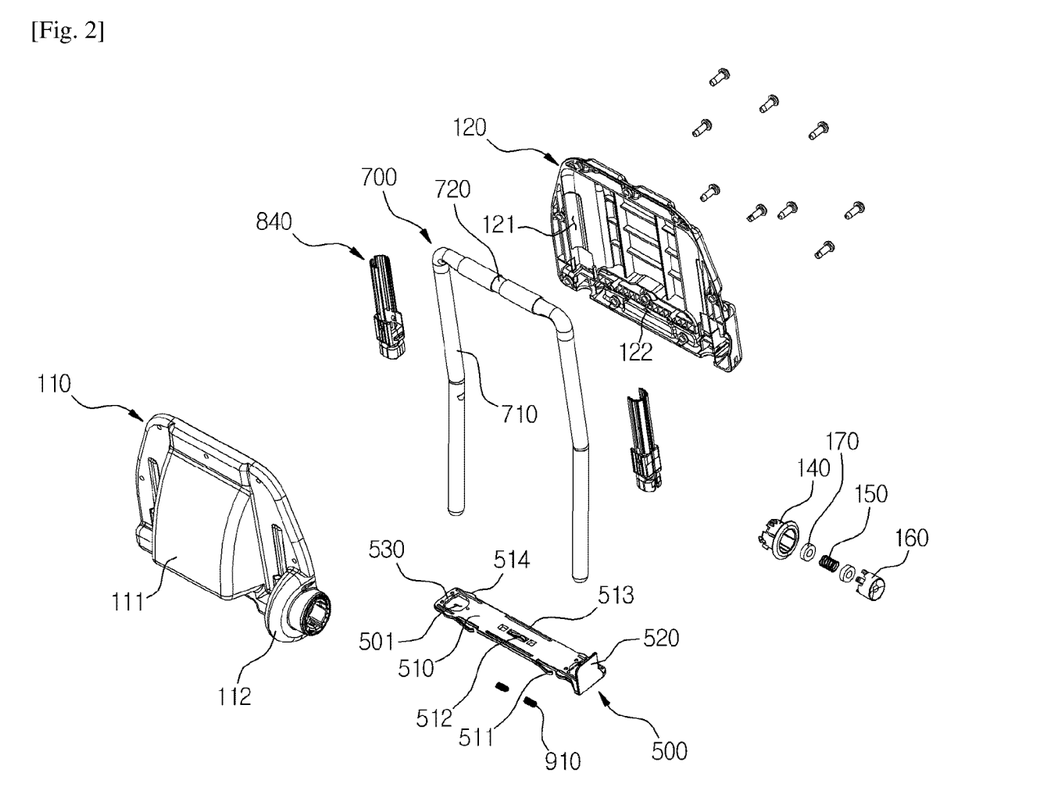
FIG. 2 is an exploded perspective view of the headrest moving device according to one exemplary embodiment of the present invention.

As illustrated in FIG. 2, a second stay rod-seating groove, a second bushing-seating groove 121, a second lock plate-seating groove 122, and a second push-transmitting part-moving space are formed in a front surface of the second case 120.

The second stay rod-seating groove communicates with the first stay rod-seating groove, the second bushing-seating groove 121 communicates with the first bushing-seating groove, the second lock plate-seating groove 122 communicates with the first lock plate-seating groove, and the second push-transmitting part-moving space communicates with the first push-transmitting part-moving space 116.

The second stay rod-seating groove is formed to be the same as or similar to the first stay rod-seating groove, and the second bushing-seating groove 121 is formed to be the same as or similar to the first bushing-seating groove, the second lock plate-seating groove 122 is formed to be the same as or similar to the first lock plate-seating groove, and the second push-transmitting part-moving space is formed to be the same as or similar to the first push-transmitting part-moving space, and thus detailed descriptions of the second stay rod-seating groove, the second bushing-seating groove 121, the second lock plate-seating groove 122, and the second push-transmitting part-moving space will be omitted.

Figure 4:
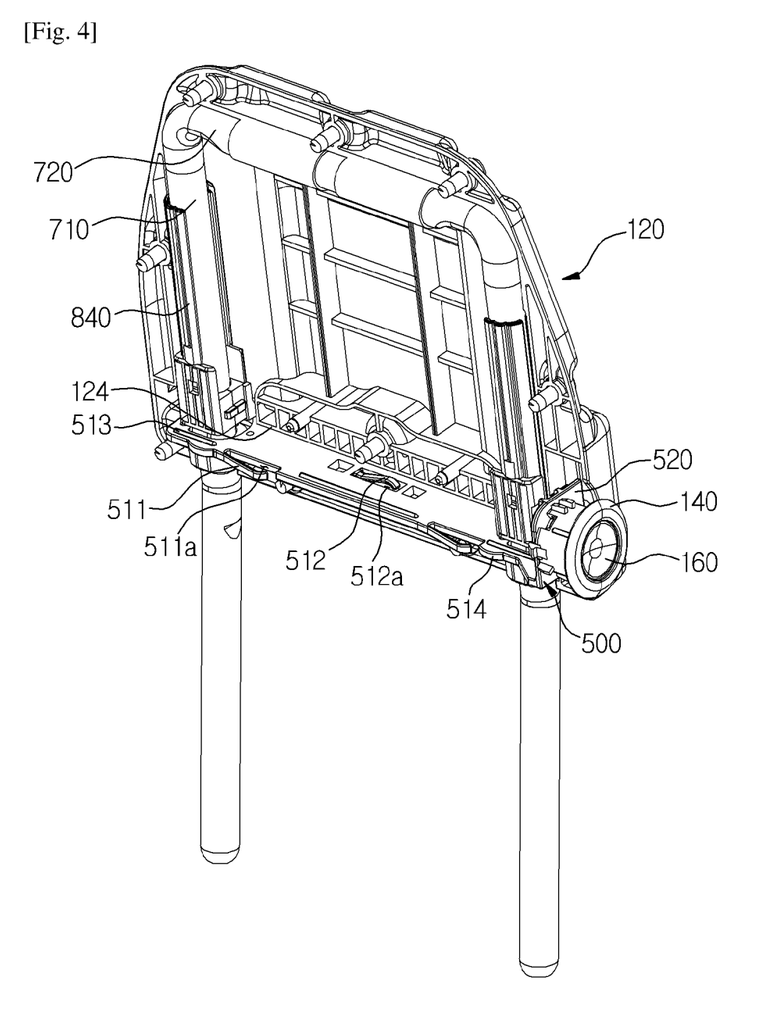
FIG. 4 is a perspective view in a state in which a first case is removed from the headrest moving device according to one exemplary embodiment of the present invention.
Figure 5:
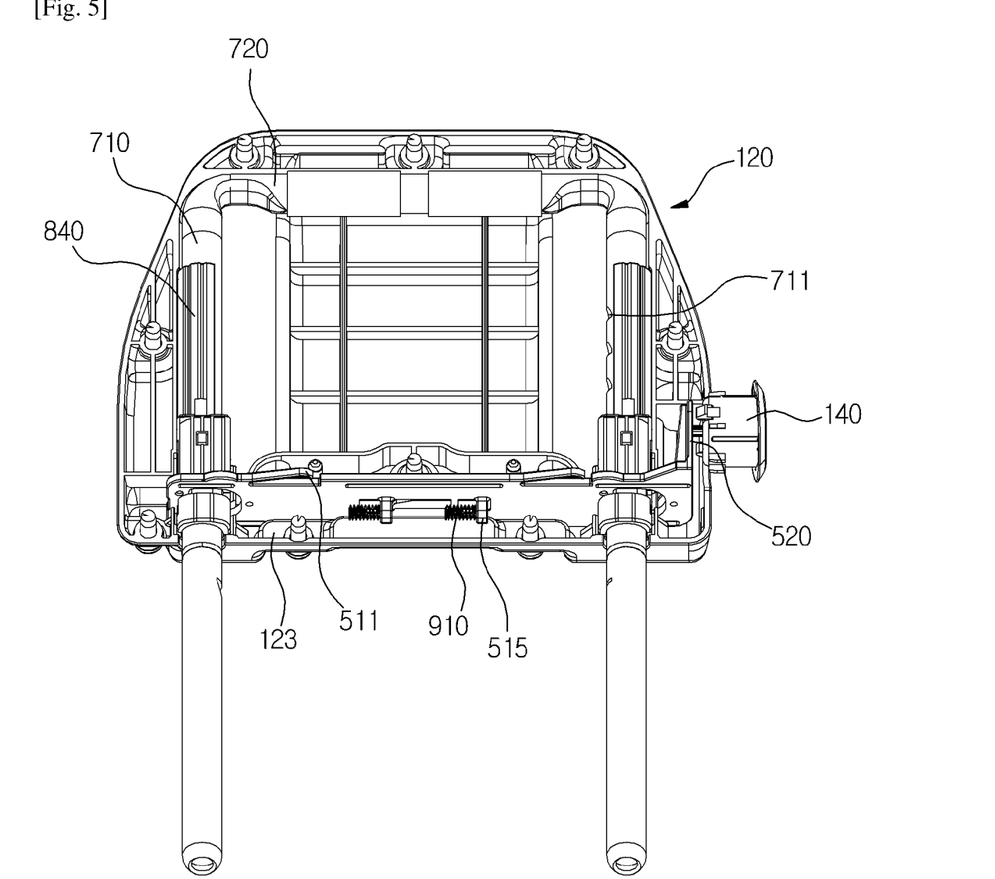
FIG. 5 is a bottom perspective view in a state in which the first case is removed from the headrest moving device according to one exemplary embodiment of the present invention.

As illustrated in FIGS. 2, 4 and 5, the second lock plate-seating groove 122 is formed by a second upper contact part 124 and a second lower contact part 123. A front end of the second upper contact part 124 is in contact with a front end of the first upper contact part 114, and the second lower contact part 123 is disposed to be separated from the first lower contact part 115. A front-rear length of the first upper contact part 114 is formed longer than that of the second upper contact part 124.

The lock plate 500 is slidable on the case and the stay rod 700 and inserted into the locking groove 711 of the stay rod 700. That is, the lock plate 500 serves to fix a vertical position of the stay rod 700.

The locking groove 711 is formed by an inclined surface and a locking surface disposed under the inclined surface and horizontally formed. Therefore, the lock plate 500 allows the case to move upward from the stay rod 700 and does not allow the case to move downward from the stay rod 700.

Figure 10:
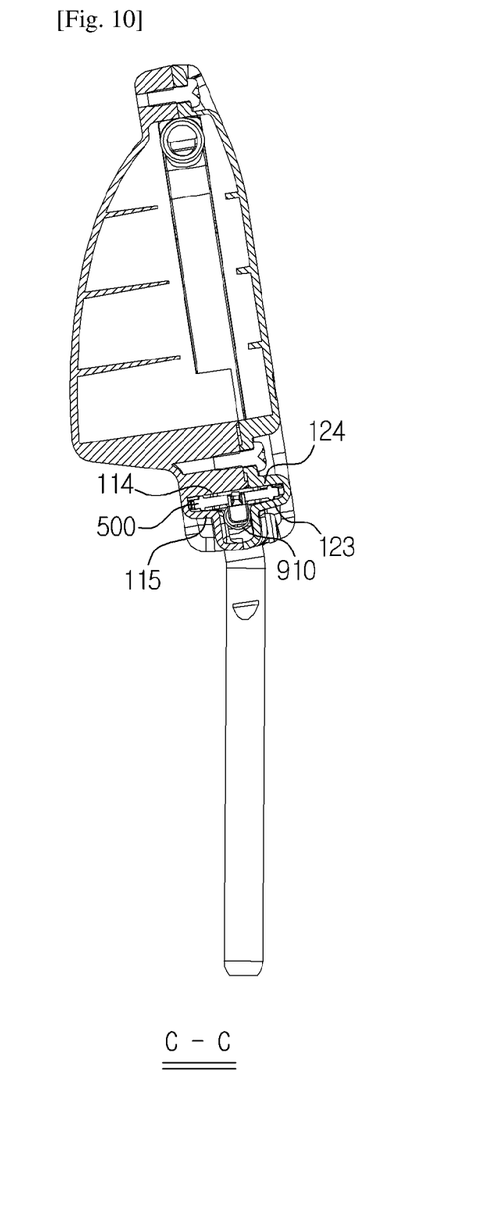
FIG. 10 is a cross-sectional view taken along line C-C of FIG. 1.

The lock plate 500 is installed to be slidable on the case in a lateral direction. As illustrated in FIG. 10, a front side of the lock plate 500 is seated on the first lock plate-seating groove, and a rear side of the lock plate 500 is seated on the second lock plate-seating groove 122.

Figure 6:
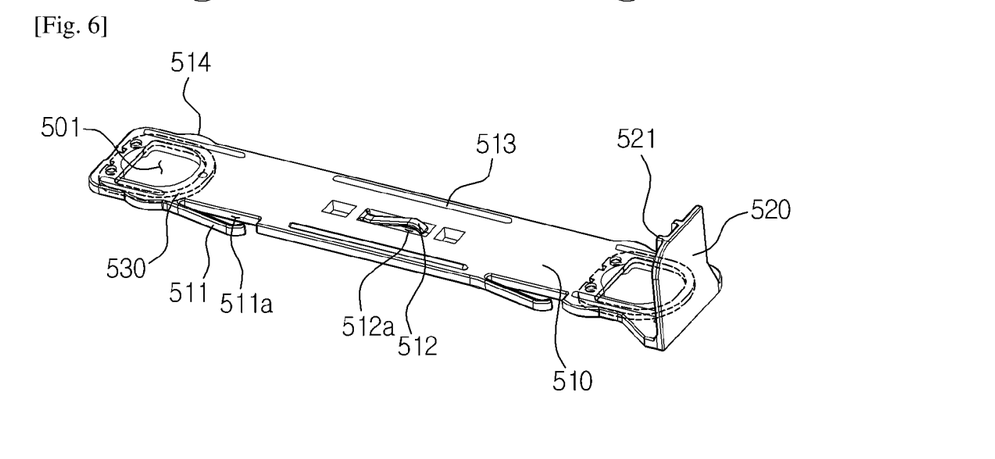
FIG. 6 is a perspective view of a lock plate of the headrest moving device according to one exemplary embodiment of the present invention.

As illustrated in FIG. 6, the lock plate 500 includes a main body 510 horizontally disposed and a push-transmitting part 520 vertically formed at one side of the main body 510.

The main body 510 is formed in a rectangular plate shape.

Through holes 501 are formed at both sides of the main body 510 so that the first rod 710 of the stay rod 700 vertically passes therethrough.

An insert member 530 is inserted into the main body 510.

The main body 510 is made of a plastic material, and the insert member 530 is made of a material having strength greater than that of the main body 510. Therefore, the lock plate 500 can be lightweight, and durability of the device can be increased. The insert member 530 has a ring shape surrounding the through hole 501. The insert member 530 is partially exposed at the outside. The exposed portion of the insert member 530 is inserted into the locking groove 711 of the stay rod 700.

The insert member 530 has a cut-out part formed at an outer circumferential surface thereof, and the cut-out part is formed adjacent to the exposed portion of the insert member 530. Position fixing through holes 501 are formed in the insert member 530 and the main body 510 to vertically pass therethrough and are disposed at a front side and a rear side of the exposed portion of the insert member 530. When the insert-injection is performed, pins are inserted into the position fixing through holes to prevent the insert member 530 from being moved by an injection molding pressure.

Figure 8:
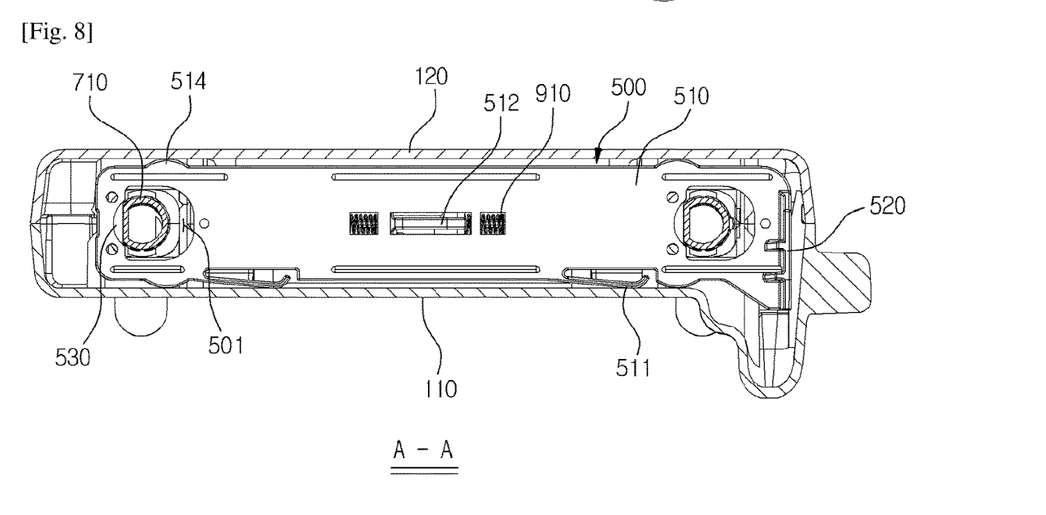
FIG. 8 is a cross-sectional view taken along line A-A of FIG. 1.
Figure 9:
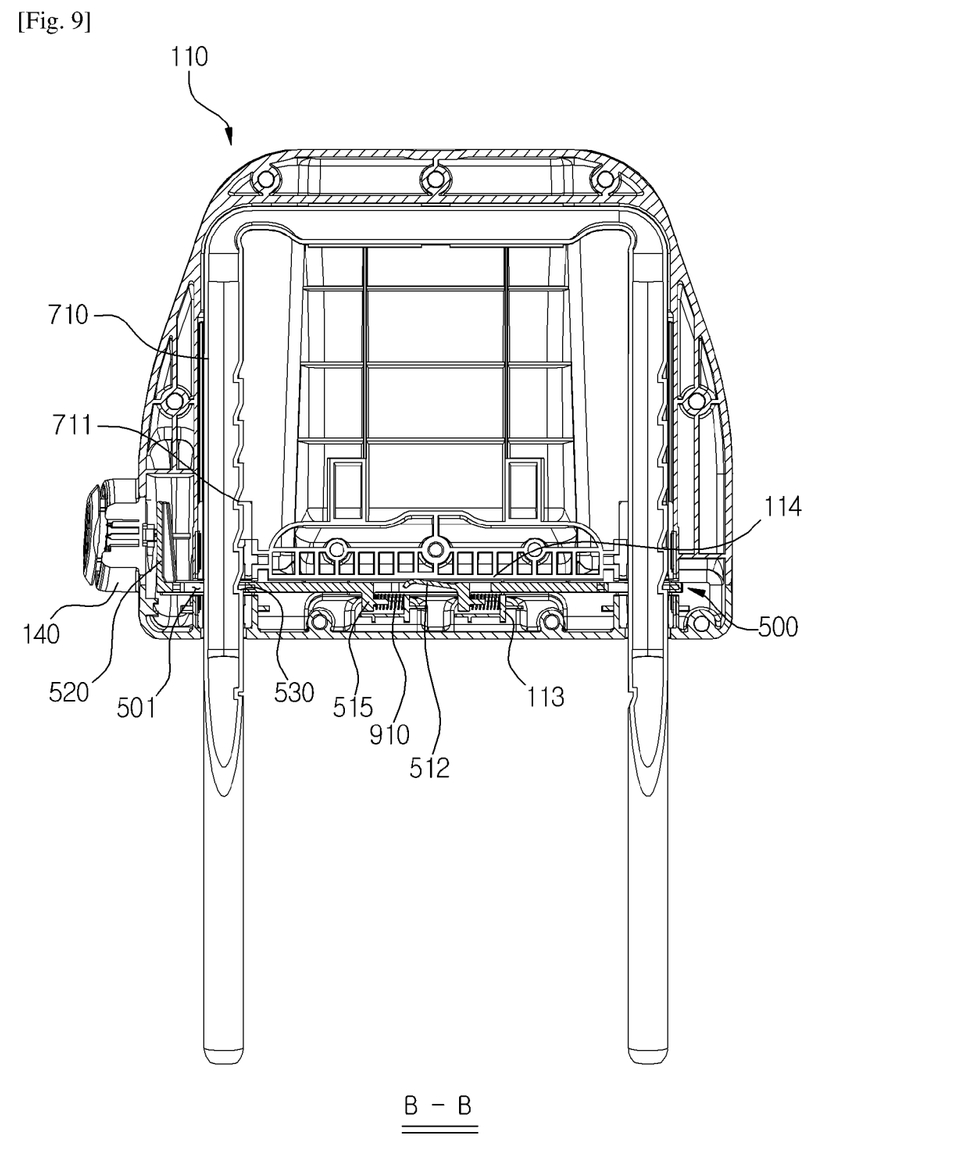
FIG. 9 is a cross-sectional view taken along line B-B of FIG. 1.

As illustrated in FIGS. 8 and 9, the elastic rib is disposed between the lock plate 500 and the case.

The elastic rib applies an elastic force to the lock plate 500 in a direction different from a sliding direction of the lock plate 500. In the embodiment of the present invention, the elastic rib applies an elastic force to the lock plate 500 in a vertical direction and a front-rear direction. Therefore, the elastic rib is disposed in front of, behind, above, or under the lock plate 500. In the embodiment of the present invention, the elastic rib includes a first elastic rib 511 disposed in front of the lock plate 500 and a second elastic rib 512 disposed above the lock plate 500.

The first and second elastic ribs 511 and 512 are formed in a long bar shape in a lateral direction.

Two first elastic ribs 511 are provided and disposed at both sides of the lock plate 500 to be adjacent to the through holes 501. The first elastic ribs 511 are disposed between the two through holes 501.

The second elastic rib 512 is disposed between the two first elastic ribs 511. The second elastic rib 512 is disposed in the middle of the main body 510.

The first and second elastic ribs 511 and 512 in a cantilever form are connected to the lock plate 500 or the case.

In the embodiment of the present invention, one ends of the first and second elastic ribs 511 and 512 are connected to the main body 510 of the lock plate 500. That is, the elastic rib is integrally formed on the main body 510. The first elastic rib 511 is formed to protrude forward, and the second elastic rib 512 is formed to protrude upward.

Left ends of the first and second elastic ribs 511 and 512 are fixed ends, and rights ends thereof are free ends.

The first and second elastic ribs 511 and 512 are formed to be inclined toward a right side thereof so that gaps with the main body 510 increase.

The first and second elastic ribs 511 and 512 have curved parts to be closer to the free ends than the fixed ends, and the curved parts come into contact with an inner surface of the first case 110. The curved part is formed by bending the right side of the first elastic rib 511 rearward or bending the right side of the second elastic rib 512 downward.

Therefore, the curved part is formed between both ends of the first and second elastic ribs 511 and 512.

Both ends of the curved part are formed to be inclined. The curved part protrudes further than an adjacent portion thereof, and only the curved part comes into contact with the case. The curved part is disposed at a foremost or uppermost side. Therefore, both ends of the first and second elastic ribs 511 and 512 are spaced apart from an inner surface of the case which is a surface in contact with the curved part.

As illustrated in FIG. 6, first and second elastic rib-inserting grooves 511*a* and 512*a* into which the fixed ends and the free ends of the first and second elastic ribs 511 and 512 are inserted are formed in the main body 510.

The first elastic rib-inserting groove 511*a* is formed so that the front side and the upper and lower portions thereof are open.

The second elastic rib-inserting groove 512*a* is formed to vertically pass therethrough.

When the lock plate 500 is assembled, free ends of the first and second elastic ribs 511 and 512 are inserted into the first and second elastic rib-inserting grooves 511*a* and 512*a*. Therefore, when the lock plate 500 is moved in a lateral direction, the free ends of the first and second elastic ribs 511 and 512 are prevented from being locked in the case.

Ribs are disposed between the case and the lock plate 500 at a side opposite of the first and second ribs 511 and 512. In the embodiment of the present invention, ribs are also disposed between the lock plate 500 and the case at sides on which the first and second elastic ribs 511 and 512 are disposed.

The rib includes first and second ribs 514 and 513 formed on the main body 510.

The first ribs 514 are formed to protrude forward and rearward at front and rear sides of the main body 510.

The first ribs 514 are disposed at both sides of the front and rear sides of the main body 510. The first ribs 514 disposed at the left sides of the front and rear sides of the main body 510 are disposed on the left of the first elastic ribs 511 disposed on the left of the main body 510, and the first ribs 514 disposed at the right sides of the front and rear sides of the main body 510 are disposed on the right of the first elastic ribs 511 disposed on the right of the main body 510. That is, the first rib 514 is disposed outward from the first elastic rib 511.

The shape of a horizontal cross-section of the first rib 514 is a circular arc.

The second ribs 513 are formed to protrude upward and downward from upper and lower portions of the main body 510. The second rib 513 is formed to be long in a lateral direction. The second ribs 513 are disposed at the front and rear sides of the second elastic rib 512 and disposed at the front and rear sides of the through hole 501.

The first supporting protrusion 515 is formed under the main body 510 to protrude downward. Two first supporting protrusions 515 are formed and disposed at both sides of the second elastic rib 512.

Insertion protrusions are formed to protrude rightward at the first supporting protrusion 515. The insertion protrusions are inserted into return springs 910. The return springs 910 apply an elastic force to the right sides of the lock plate 500. The return spring 910 is provided as a coil spring, and a right side of the return spring 910 is supported by the first supporting protrusion 515, and a left side of thereof is supported by the second supporting protrusion 113. The return spring 910 allows the lock plate 500 to return to an original position thereof when a force pressing the lock plate 500 is removed.

The push-transmitting part 520 is formed in a plate form, and an enhancing rib 521 is formed between the push-transmitting part 520 and an upper surface of the main body 510.

The first rod 710 of the stay rod 700 is surrounded by a bushing part 840.

A front side of the bushing part 840 is seated in the first bushing-seating groove, and a rear side of the bushing part 840 is seated in the second bushing-seating groove 121, and thus the bushing part 840 is fixed and installed inside the case.

The front side of the bushing part 840 is seated in the first bushing-seating groove, and the rear side of the bushing part 840 is seated in the second bushing-seating groove 121.

Figure 7:
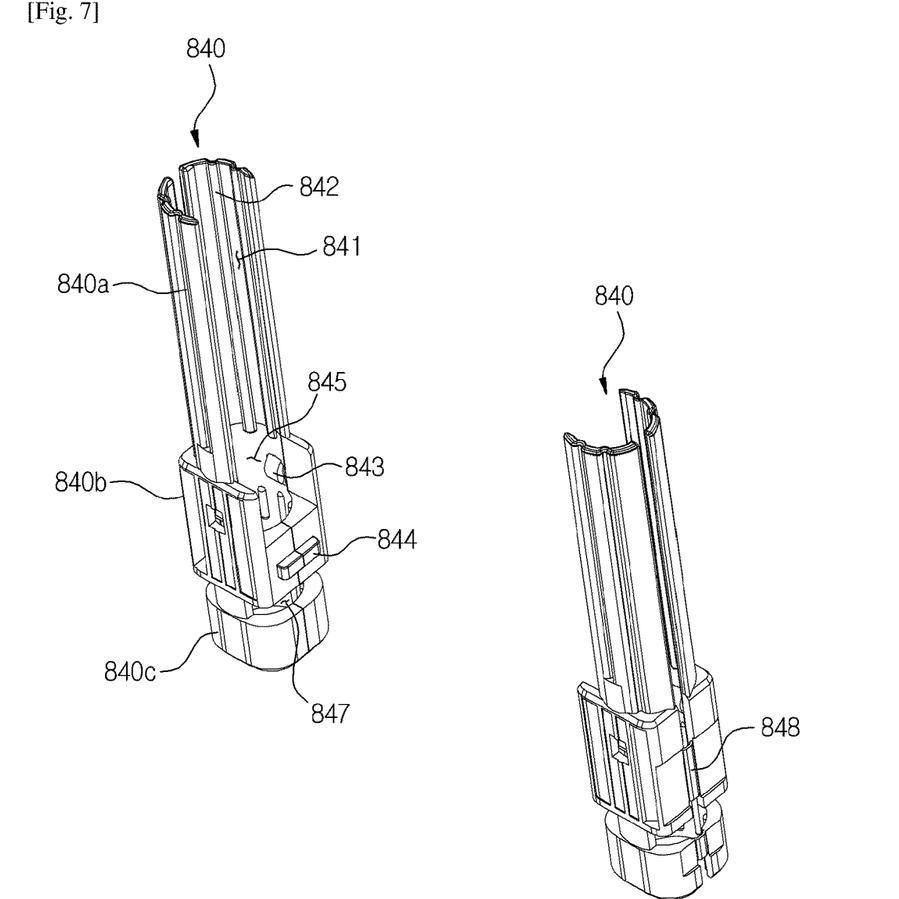
FIG. 7 is a perspective view of a bushing part of the headrest moving device according to one exemplary embodiment of the present invention.

As illustrated in FIG. 7, a stay rod-through hole 845 is vertically formed in the bushing part 840 so that the first rod 710 passes therethrough.

Several contact ribs 842 are vertically formed on an inner side of the bushing part 840 to minimize a contact area with the first rod 710 and stably support the first rod 710.

The bushing part 840 includes a first part 840*a*, a second part 840*b* disposed under the first part 840*a*, and a third part 840*c* disposed under the second part 840*b*.

A first opening 841 is formed at an inner side of the first part 840*a*. The first opening 841 allows the second rod 720 not to interfere with the bushing part 840 when the case vertically moves on the stay rod 700.

An elastic contact part 843 is formed at a front or rear side of the second part 840*b*. The elastic contact part 843 is formed to be curved so that a vertical cross-sectional shape thereof is a circular arc.

An assembling protrusion 844 is formed to protrude leftward or rightward at a left or right side of the second part 840*b*. The assembling protrusion 844 is inserted into the assembling protrusion inserting groove of the first case 110. The assembling protrusion 844 allows a position of the bushing part 840 to be fixed.

Second openings 847 are formed at both sides of the third part 840c in a lateral direction. The lock plate 500 passes through the second openings 847.

A thin-wall part 848 which is thinner than an adjacent portion thereof is formed at one side of the bushing part 840. The thin-wall part 848 is vertically formed on the second part 840b. The bushing part 840 is manufactured so that both ends thereof are separated from each other. When the bushing part 840 is used, the thin-wall part 848 is curved, and an insertion protrusion formed on one end of the bushing part 840 is inserted into an insertion groove formed on the other end thereof. Therefore, the bushing part 840 is easily manufactured.

Further, as illustrated in FIG. 2, the case further includes a button to push the push-transmitting part 520.

The button includes a button part 160, a bezel part 140 on which the button part 160 is slidably installed, and a button returning spring 150 returning the bezel part 140.

The button part 160 is fastened to the bezel part 140 by a hook and installed to be slidable in the bezel part 140.

The button part 160 has a concave portion which is touched by a hand of a passenger.

The bezel part 140 is installed at a right side of the case by a hook and the like.

A seating groove 142 in which the button part 160 is seated is formed in the bezel part 140.

A contact protrusion is formed on an inner wall of the bezel part 140 in a lateral direction.

A spring insertion rod formed on the inner wall of the bezel part 140 is inserted into the button returning spring 150.

Further, a bumper 170 having a ring shape is formed between the button part 160 and the button returning spring 150 and/or between the bezel part 140 and the button returning spring 150. The bumper 170 can reduce noise.

Operation of the embodiment of the present invention having above-described configuration will be described.

When the button part 160 is pressed to adjust a height of the headrest, the button part 160 presses the push-transmitting part 520, and the lock plate 500 is slid leftward. Thus, the insert member 530 formed in the locking groove 711 of the stay rod 700 escapes from the locking groove 711. Therefore, the headrest can be freely moved in a vertical direction. When the headrest is moved to a target position and then a force pressing the button part 160 is removed, the lock plate 500 is slid rightward by an elastic force of the return spring 910. The lock plate 500 is inserted into the locking groove 711. Therefore, a position of the headrest is fixed.

While the present invention has been described with reference to the exemplary embodiments, it may be understood by those skilled in the art that various changes and modifications may be made without departing from the spirit and scope of the present invention as defined by the appended claims.

DESCRIPTION OF SYMBOLS

Description of Symbols for Main Parts in Drawings

110: FIRST CASE, 111: FIRST PROTRUDING PART
112: SECOND PROTRUDING PART
113: SECOND SUPPORTING PROTRUSION
114: FIRST UPPER CONTACT PART
115: FIRST LOWER CONTACT PART
116: FIRST PUSH-TRANSMITTING PART-MOVING SPACE
120: SECOND CASE
121: SECOND BUSHING-SEATING GROOVE
122: SECOND LOCK PLATE-SEATING GROOVE
123: SECOND LOWER CONTACT PART
124: SECOND UPPER CONTACT PART
140: BEZEL PART, 150: BUTTON RETURNING SPRING
160: BUTTON PART, 170: BUMPER
500: LOCK PLATE, 501: THROUGH HOLE
510: MAIN BODY
511: FIRST ELASTIC RIB
511A: FIRST ELASTIC RIB-INSERTING GROOVE
512: SECOND ELASTIC RIB
512A: SECOND ELASTIC RIB-INSERTING GROOVE
513: SECOND RIB, 514: FIRST RIB
515: FIRST SUPPORTING PROTRUSION
520: PUSH-TRANSMITTING PART
521: ENHANCING RIB, 530: INSERT MEMBER
700: STAY ROD, 710: FIRST ROD
711: LOCKING GROOVE, 720: SECOND ROD
840: BUSHING PART, 840A: FIRST PART
840B: SECOND PART, 840C: THIRD PART
841: FIRST OPENING, 842: CONTACT RIB
843: ELASTIC CONTACT PART
844: ASSEMBLING PROTRUSION
845: STAY ROD-THROUGH HOLE
847: SECOND OPENING
848: THIN-WALL PART, 910: RETURN SPRING

The invention claimed is:

1. A headrest moving device comprising:
a case;
a stay rod, including:
an upper portion, being accommodated in the case, having a locking groove; and
a lower portion being extended downward from the upper portion; and
a lock plate, being accommodated in the case, including:
a main body, being slidable in the case and coupled with the stay rod; and
an elastic rib, being positioned between the main body and the case,
wherein the upper portion of the stay rod is inserted into the main body of the lock plate,
wherein the elastic rib applies an elastic force to the main body in a direction different from a sliding direction of the main body,
wherein the elastic rib includes a curved part bent between both ends of the elastic rib, and
wherein the curved part is in contact with one of the main body and the case.

2. The headrest moving device of claim 1, wherein one end of the elastic rib is connected to the main body of the lock plate.

3. The headrest moving device of claim 1, wherein one end of the elastic rib is connected to an edge of the main body of the lock plate.

4. The headrest moving device of claim 3, wherein the lock plate further includes a rib connected to the main body of the lock plate, wherein the rib is positioned between the main body of the lock plate and the case, and wherein the rib is disposed opposite to the elastic rib.

5. The headrest moving device of claim of 1, wherein one end of the elastic rib is connected to the lock plate or the case, wherein the main body of the lock plate includes an inserting groove adjacent to the elastic rib, and wherein another end of the elastic rib is accommodated in the inserting groove of the main body.

6. The headrest moving device of claim of 1 or 2, wherein the case includes:
a button configured to press the lock plate; and
a bumper,
wherein the button includes:
a button part;
a bezel part, wherein the button part is slidably installed at the bezel part; and
a button returning spring configured to return the button part; and
wherein the bumper is disposed between the button part and the button returning spring or between the bezel part and the button returning spring.

7. The headrest moving device of claim 1, wherein the lock plate further includes a through hole being formed at the main body, and wherein the upper portion of the stay rod is inserted into the through hole.

8. The headrest moving device of claim 7, wherein the lock plate further includes an insert member fixed to the main body of the lock plate, wherein the insert member is adjacent to the through hole of the lock plate.

9. The headrest moving device of claim 8, wherein the insert member has a ring shape and surrounds the through hole.

10. The headrest moving device of claim 9, wherein a strength of the insert member is greater than a strength of the main body.

11. The headrest moving device of claim 9, wherein the insert member is coupled with the locking groove.

12. The headrest moving device of claim 1, wherein the upper portion of the stay rod is elongated upward from the lower portion of the stay rod.

13. The headrest moving device of claim 12, wherein the locking groove is provided in plurality, and wherein the plurality of the locking groove are located on along a longitudinal direction of the upper portion of the stay rod.

14. The headrest moving device of claim 12, wherein the locking groove includes:
an inclined surface being angled with a longitudinal direction of the upper portion of the stay rod; and
a locking surface, being extended horizontally from the inclined surface.

15. The headrest moving device of claim 14, wherein the locking surface prohibits the lock plate from moving downward when the lock plate is coupled with the locking groove.

16. The headrest moving device of claim 9, further comprising:
a return spring, being installed in the case, and being coupled with the lock plate, wherein the lock plate further includes an insertion protrusion being coupled with the return spring, and
wherein the return spring applies another elastic force to the lock plate in the sliding direction of the main body.

17. The headrest moving device of claim 16, wherein the insert member is uncoupled with the locking groove when the lock plate moves in a first direction, and wherein the first direction is parallel to the sliding direction.

18. The headrest moving device of claim 17, wherein the insert member is coupled with the locking groove when the lock plate moves in a second direction, and wherein the second direction is opposite to the first direction.

19. The headrest moving device of claim 18, wherein the locking groove is dent in the second direction.

20. The headrest moving device of claim 1, wherein the elastic rib includes first and second elastic ribs, wherein one end of the first elastic rib is connected to an edge of the main body of the lock plate, and wherein one end of the second elastic rib is connected to a central area of the main body.

* * * * *